United States Patent [19]

Cornell

[11] Patent Number: 4,936,688

[45] Date of Patent: Jun. 26, 1990

[54] FOOD STIRRING APPARATUS

[76] Inventor: Kathy M. Cornell, P.O. Box 206, West Berne, N.Y. 12023

[21] Appl. No.: 270,616

[22] Filed: Nov. 14, 1988

[51] Int. Cl.[5] .......................... B01F 7/20; B01F 15/06; A47J 27/00; A47J 43/07

[52] U.S. Cl. ...................................... 366/146; 99/348; 219/432; 219/433; 366/197; 366/328

[58] Field of Search ................ 366/144, 146, 145, 197, 366/207, 247, 249, 250, 251, 252, 328, 343, 344, 279, 325, 285, 286; 99/348, 352; D7/376, 379, 380, 412, 415, 323, 354, 362, 363, 364, 365, 367, 366, 402, 403, 386, 368; 219/429, 432, 433, 435, 443, 458, 459, 457, 521; 416/227 R, 231 A, 231 R, 231 B, ; 403/354, 375

[56] References Cited

U.S. PATENT DOCUMENTS

| | | | |
|---|---|---|---|
| 50,963 | 11/1865 | Shute | 366/328 |
| D. 198,333 | 6/1964 | Boldt | D7/376 |
| D. 206,823 | 1/1967 | Peterson | D7/376 X |
| 273,569 | 3/1883 | Marchand | 366/328 X |
| D. 279,858 | 7/1985 | Janssens | D7/376 X |
| 678,456 | 7/1901 | Browne | 366/343 X |
| 995,001 | 6/1911 | Hathaway | 416/231 A X |
| 2,032,571 | 3/1936 | Gilbert et al. | 99/348 X |
| 2,046,784 | 7/1936 | Krause | 99/348 X |
| 2,254,271 | 9/1941 | Cretors | 99/348 X |
| 2,275,901 | 3/1942 | Harwood | 219/432 X |
| 2,462,089 | 2/1949 | Frisbie | 366/197 |
| 2,727,395 | 12/1955 | White | 366/197 X |
| 2,805,843 | 9/1957 | Block | 366/343 |
| 3,005,399 | 10/1961 | Libson | 99/348 |
| 3,064,950 | 11/1962 | DeLaria | 366/325 X |
| 3,171,636 | 3/1965 | Barlow et al. | 366/285 X |
| 3,357,685 | 12/1967 | Stephens | 99/348 X |
| 3,752,057 | 8/1973 | Groen, Jr. | 99/348 |
| 3,783,770 | 1/1974 | Aries | 99/348 |
| 4,151,792 | 5/1979 | Nearhood | 99/348 |
| 4,176,971 | 12/1979 | Ernster et al. | D7/379 X |
| 4,339,992 | 7/1982 | Kurland | 99/348 |
| 4,568,193 | 2/1986 | Contri et al. | D7/379 X |
| 4,576,089 | 3/1986 | Chauvin | 99/348 X |

FOREIGN PATENT DOCUMENTS

| | | | |
|---|---|---|---|
| 3261 | of 1899 | United Kingdom | 366/328 |

*Primary Examiner*—Harvey C. Hornsby
*Assistant Examiner*—Scott J. Haugland
*Attorney, Agent, or Firm*—Leon Gilden

[57] ABSTRACT

A food stirring apparatus is set forth wherein a pivotally mounted mixing head has releasably secured thereto a single rotatable axially aligned post having integrally secured thereto a plurality of mixing blades. An upper set of mixing blades comprises three equally spaced blades wherein each blade includes a plurality of openings. The openings comprise non-circular through-extending openings wherein each blade includes plural rows of openings and wherein the rows of openings are vertically offset with respect to adjacent blades. Further, the upper openings are axially offset relative to the lower openings to effect varying flow rates and flow directions of the mixing fluid passing therethrough to effect efficient mixing of a fluid mixture. A lower set of blades includes non-circular openings of equal pattern arrangement to the upper set of blades, but wherein the lower set of blades are rotatably offset sixty degrees relative to the upper set of blades.

2 Claims, 4 Drawing Sheets

FOOD STIRRING APPARATUS

BACKGROUND OF THE INVENTION

1. Field of the Invention

The field of invention relates to mixing apparatus, and more particular pertains to a new and improved food stirring apparatus wherein the same is arranged with non-circular openings variously positioned about the blades to effect enhanced stirring of fluid.

2. Description of the Prior Art

The use of mixing apparatus in food preparation is well known in the prior art. Conventionally, blades have been of symmetrical configuration as they are axially positioned about a central elongate shaft. For example, U.S. Pat. No. 4,568,193 to Contri sets forth a conventional food stirring apparatus utilizing a pivotal mixing head mounted to a base wherein the mixing head rotatably mounts a plurality of axially spaced stirring devices wherein each stirring device is of symmetrical configuration provided with a symmetrical arrangement of openings.

U.S. Pat. No. 4,176,971 to Eruster sets forth a mixing device wherein a plurality of wire-like mixers are axially spaced relative to each other and are provided with complementary openings for interaction and stirring of food within an associated bowl.

U.S. Pat. No. 2,727,395 to White sets forth a further example of a food mixing device utilizing a plurality of interengaging stirrers wherein each stirrer is provided with a plurality of elongate openings symmetrically formed about the stirrer.

U.S. design patent No. 279,858 sets forth an example of a conventional mixing stand.

U.S. design patent No. 198,333 to Boldt sets forth a further example of a mixing stand utilizing a plurality of stirrers for agitation of food passing therethrough.

U.S. design patent No. 206,823 to Peterson sets forth an additional example of a mounted mixing device for mixing food of varying configuration but of typical construction in minimizing the effect of the stirring blades upon food to be mixed.

As such, it may be appreciated that there is a continuing need for a new and improved food stirring apparatus which addresses both the problem of effectiveness and compactness of organization, and in this respect the present invention substantially fulfills this need.

SUMMARY OF THE INVENTION

In view of the foregoing disadvantages inherent in the known types of food stirring apparatus now present in the prior art, the present invention provides a food stirring apparatus wherein the same is provided with two sets of axially spaced blades wherein each blade is provided with plural rows of apertures wherein the apertures are axially misaligned from one another and wherein each plurality of rows of apertures on each blade is spaced relative to each other to effect enhanced mixing. As such, the general purpose of the present invention, which will be described subsequently in greater detail, is to provide a new and improved food stirring apparatus which has all the advantages of the prior art food stirring apparatus and none of the disadvantages.

To attain this, the present invention comprises a food stirring apparatus utilizing a base and a head pivotally mounted to said base wherein the base is provided with a single rotatably mounted elongate shaft provided with a plurality of axially spaced blades. A plurality of shafts are utilized to effect mixing of various viscosities of food mixtures. Each blade of the sets of blades is provided with a plurality of non-circular openings within an overlying row of openings axially displaces from an underlying row of openings, and each of said blade's pairs of openings are vertically displaced relative to an adjacent blade.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved food stirring apparatus which has all the advantages of the prior art food stirring apparatus and none of the disadvantages.

It is another object of the present invention to provide a new and improved food stirring apparatus which may be easily and efficiently manufactured and marketed.

It is a further object of the present invention to provide a new and improved food stirring apparatus which is of a durable and reliable construction.

An even further object of the present invention is to provide a new and improved food stirring apparatus which is susceptible of a low cost of manufacture with regard to both materials and labor, and which accordingly is then susceptible of low prices of sale to the consuming public, thereby making such food stirring apparatus economically available to the buying public.

Still yet another object of the present invention is to provide a new and improved food stirring apparatus which provides in the apparatuses and methods of the prior art some of the advantages thereof, while simultaneously overcoming some of the disadvantages normally associated therewith.

Still another object of the present invention is to provide a new and improved food stirring apparatus formed with a single rotatable replaceable shaft wherein each shaft is provided with a plurality of sets of blades of non-circular openings to effect enhanced stirring of food mixtures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
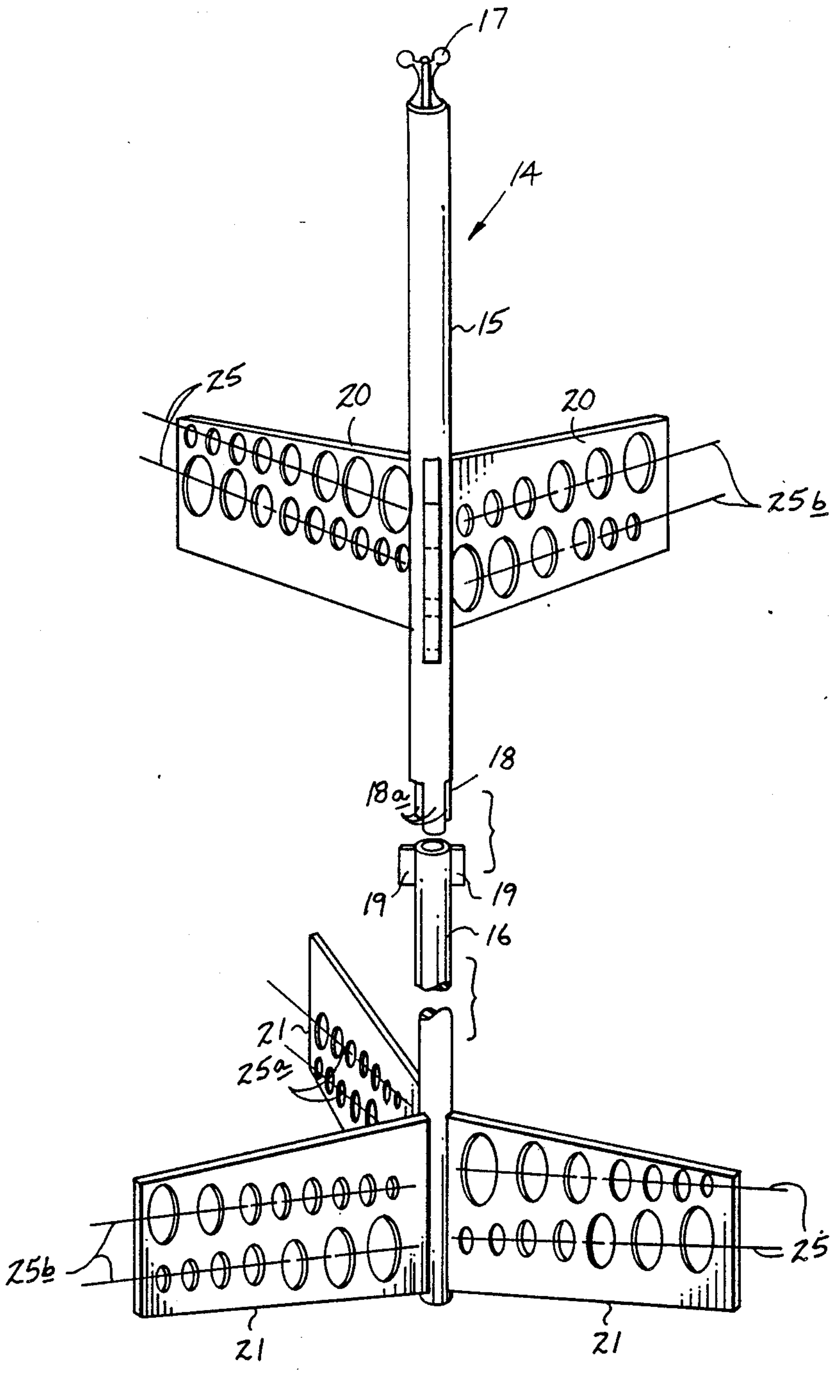
FIG. 1 is an isometric illustration of a typical stirring member of the instant invention.
Figure 2:
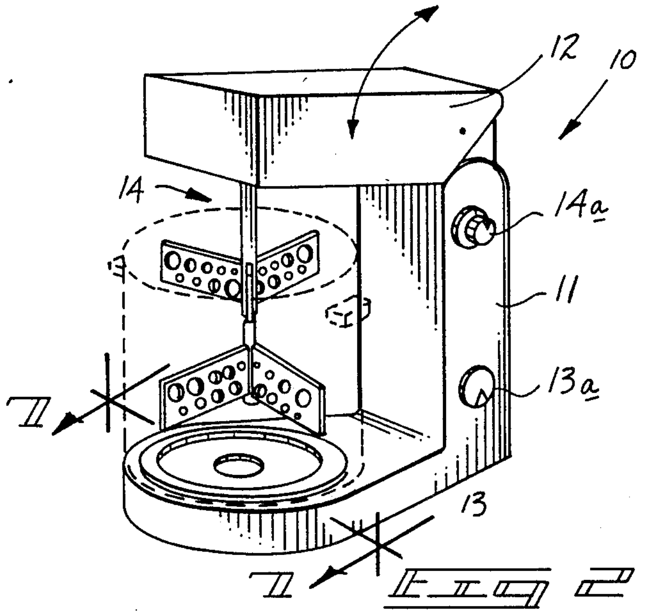
FIG. 2 is an isometric illustration of the instant invention.

With reference now to the drawings, and in particular to FIGS. 1 to 7 thereof, a new and improved food stirring apparatus embodying the principles and concepts of the present invention and generally designated by the reference numeral 10 will be described.

More specifically, it will be noted that the food stirring apparatus 10 essentially comprises an "L" shaped base member 11 pivotally mounting an upper head 12 that may be repositioned from a generally horizontal to a vertical position for ease of assembly of an associated stirring assembly 14 in a snap-fit fashion utilizing removably engageable connector portions in a manner conventionally utilized in the prior art. The "L" shaped base member 11 includes a heating grid 13 formed within an upper surface of a horizontal leg of the "L" shaped member for providing a heating capability to the instant invention to enable cooking of various items, such as puddings and the like to maintain a lessened viscosity of such items and enhance the stirring effect. Conventional heat control means 13a and speed control means 14a respectively control the temperature of the heating grid 13 and the speed of the rotationally mounted stirring assembly 14 in a manner well known in the prior art utilizing typically rheostatic controls.

The stirring assembly 14 is comprised of an upper stirring member 15 accepting a lower stirring member 16 wherein the upper stirring member 15 has formed at a lower terminal end of its elongate shaft, a cavity 18 defined by downwardly depending legs 18a defining slots therebetween to frictionally accept and engage an upper terminal end of the lower stirring member and accept therewithin orthogonal projections 19 of the lower stirring member wherein the projections 19 are of a length equal to the slot defined by legs 18a.

The upper blades 20, 20a, and 20b are of equal configuration to the lower blades 21 wherein for purposes of illustration the details of the upper blades 20 will be described.

Figure 3:
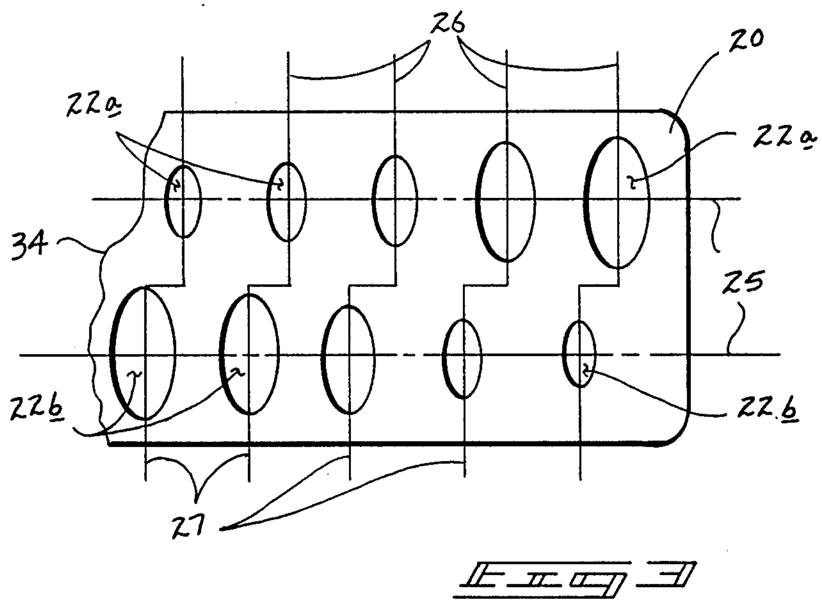
FIG. 3 is an orthographic view of a typical blade configuration as utilized by the instant invention.

The upper blade 20 illustrated in FIG. 3 utilizes a plurality of rows comprising an upper row of ellipsoidal openings 22a and a lower row of ellipsoidal openings 22b. The upper row of ellipsoidal openings is formed of gradually increasing ellipsoidal openings 22a from an interior edge 34 to an exterior edge 35 wherein the lower row of ellipsoidal openings 22b are of gradually decreasing size as measured from the interior edge 34 to the exterior edge 35 wherein the upper and lower rows of ellipsoidal openings 22a and 22b respectively are bisected by parallel upper and lower bisecting planes 25 wherein the planes 25 are each parallel to one another.

Further, the upper ellipsoidal openings 22a are further defined by parallel upper axes 26 bisecting the ellipsoidal openings 22a into equal right and left segments wherein the parallel upper axes 26 are parallel and equally spaced from one another and are displaced horizontally relative to parallel lower axes 27 bisecting the lower ellipsoidal openings 22b.

Figure 4:
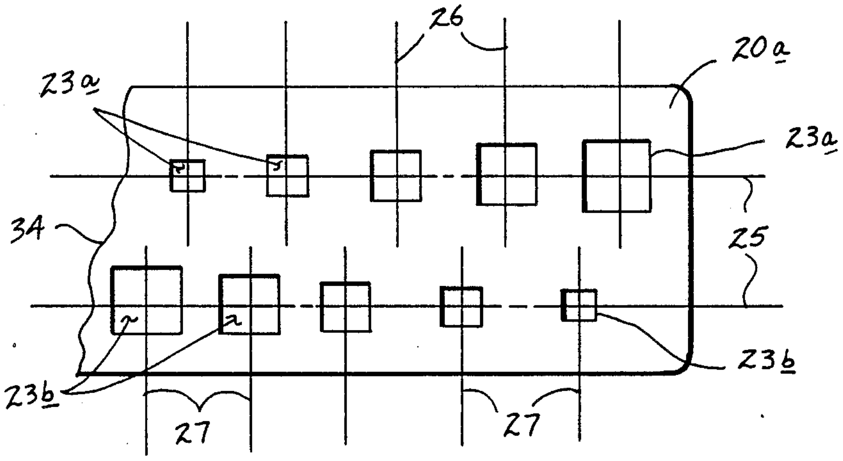
FIG. 4 is an orthographic illustration taken in elevation of a further example of blade structure utilized by the instant invention.
Figure 5:
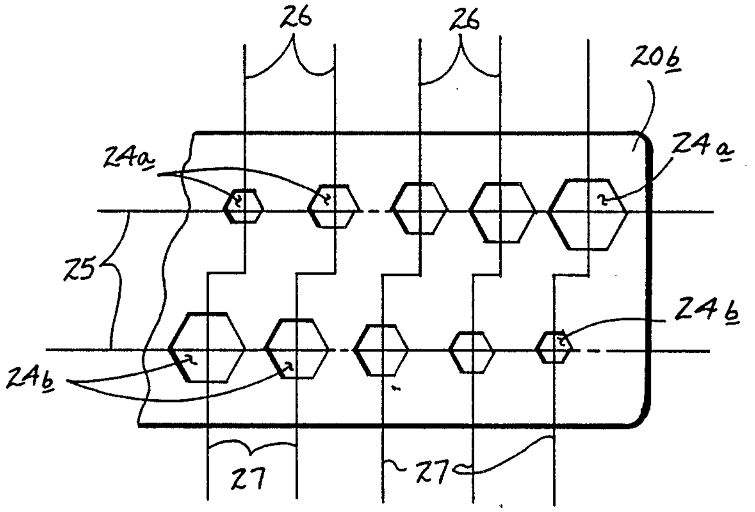
FIG. 5 is an orthographic view taken in elevation of yet another blade organization as utilized by the instant invention.

Similarly, as illustrated in FIGS. 4 and 5 respectively, upper row of square openings 23a are spaced in alignment with a plurality of spaced bisecting planes 25 including an upper bisecting plane 25 parallel to an equally spaced lower bisecting plane 25 dividing the lower squares 23b into equal upper and lower portions. As in the sequence of ellipsoidal openings of FIG. 3, the square openings of FIG. 4 in the upper row comprising the squares 23a are of increasing size from interior edge 34 to exterior edge 35. Similarly, the hexagonal openings comprising an upper row 24a and a lower row 24b are similarly bisected by spaced bisecting planes 25 to equally bisect the respective rows of hexagonal openings. Further, the upper rows of respective square and hexagonal openings 23a and 24a are bisected into equal right and left portions by vertical parallel upper axes 26 wherein the vertical upper parallel axes 26 are horizontally displaced from vertically lower parallel axes 27 bisecting the respective lower rows of square openings and hexagonal openings 23b and 24b respectively.

Figure 6:
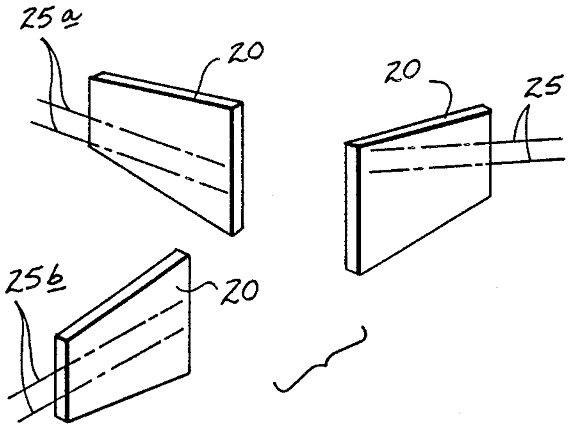
FIG. 6 is a diagrammatically illustrates the horizontal alignment of the various openings of the blade structure and further illustrates the vertical misalignment of the various openings utilized in the blade structure.
Figure 7:
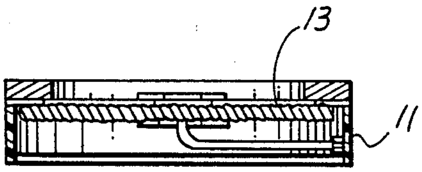
FIG. 7 is an orthographic view taken along the lines 7—7 of FIG. 2 in the direction indicated by the arrows.

Reference to FIG. 6 illustrates respective parallel bisecting planes 25 which are vertically displaced relative to bisecting planes defined within adjacent blades wherein the upper blades 20 comprise three blades equally spaced in 120 degree intervals about the upper support shaft and wherein respective pairs of upper and lower bisecting planes within respective blades are vertically displaced relative to one another with respect to relative blades 1, 2, and 3. Further, the upper blade portions 20 are displaced and offset 60 degrees relative to the lower blades 21 to provide enhanced stirring of a fluid to be processed and stirred by the instant invention. Further, as the lower stirring members 16 supporting various opening organizations, as illustrated per FIGS. 3, 4, and 5, may thereby be substituted to provide varying opening patterns with respect to upper blades 20 and lower blades 21 relative to the upper stirring members 15 and lower stirring members 16.

As to the manner of usage and operation of the instant invention, the same should be apparent from the above disclosure and accordingly no further discussion relative to the manner of usage and operation of the instant invention shall be set forth.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A food mixer comprising, in combination, an "L" shaped base including a lower horizontal leg and a vertical upstanding leg, said lower horizontal leg including an upper planar support surface with a selectively actuatable heating means therein for heating a container positionable on said surface, and a head portion pivotally mounted to said upstanding vertical leg at one end and rotatably and selectively mounting a stirring assembly orthogonally and downwardly projecting adjacent a further end of said head portion, wherein said stirring assembly is in an overlying relationship to said upper support surface when said head portion is pivoted to a downward position, and said stirring assembly including an elongate axially aligned shaft member and said shaft member includes an upper stirring member and a lower stirring member selectively securable together, and said upper stirring member includes a connector selectively securable to said head portion at an upper end thereof and further includes a plurality of slots defined by downwardly extending legs on said upper stirring member, and said lower stirring member includes orthogonal projections integrally formed on an upper end of said lower stirring member for reception within said slots of said upper stirring member selectively securing said upper stirring member and said lower stirring member together for stirring contents of said container when positioned on said base, and wherein said upper stirring member and said lower stirring member each include at least three blades, and wherein said upper blades are spaced 120 degrees apart relative to each other, and the lower blades are secured to said lower stirring member in a circular array spaced 120 degrees apart, said upper blades are coaxially aligned with said lower blades and offset 60 degrees from vertical alignment with said lower blades.

2. A food mixer as set forth in claim 1 wherein each of said upper blades and each of said lower blades include a plurality of horizontal rows of non-circular openings.

* * * * *